Patented July 11, 1950

2,514,424

UNITED STATES PATENT OFFICE 2,514,424

VINYL HALIDE RESIN COMPOSITIONS CONTAINING HYDROXYSTEARIC ACID ESTERS AS PLASTICIZERS AND ALKALINE EARTH METAL RICINOLEATES AS STABILIZERS

Malcolm Kent Smith, Elizabeth, N. J., assignor to The Baker Castor Oil Company, Jersey City, N. J., a corporation of New Jersey No Drawing. Application January 28, 1948, Serial No. 4,927

12 Claims. (Cl. 260—32.2)

This invention relates to stabilized plasticized polyvinyl ester compositions, and more particularly to mixtures of polyvinyl esters which are vinyl chloride-vinyl ester copolymers containing from 85 to 92% by weight of vinyl chloride with a plasticizing modifier comprising an acylated ester of 12-hydroxy stearic acid having an iodine number of up to about 15, and with a stabilizer comprising an alkaline earth ricinoleate.

Certain vinyl resins have previously been plasticized, and it has also been known to use stabilizers for the plasticized polyvinyl ester resins. The plasticization and stability of the various polyvinyl ester resins, of which there is a virtually infinite number of compositions, vary considerably, depending upon the constitution of the polyvinyl ester which is to be plasticized, and/or stabilized. For example, certain vinyl resins may be stabilized by an alkaline earth ricinoleate, whereas other vinyl resins cannot be stabilized by an alkaline earth ricinoleate. Also, alkaline earth ricinoleates are effective with certain vinyl resins in admixtures with certain known commercial plasticizers whereas, with other known commercial plasticizers, alkaline earth ricinoleates are ineffective as stabilizers.

According to the present invention, it has been discovered that a particular combination of vinyl resin, plasticizer, and stabilizer is especially effective. Films containing this combination of ingredients show only slight changes in color and practically no change in flexability, after exposure to extremely severe aging conditions. The resins according to this invention may be shaped other than by depositing a film, such as by molding. When the molding process is used, the articles formed thereby are readily and easily removed from the mold. In the particular combinations of this invention, it is believed that the alkaline earth ricinoleates serve as the effective mold release agents.

The vinyl resins used in this invention are within the genus of copolymers of vinyl halides and vinyl esters of aliphatic acids, and, within that genus, are specific to such copolymers containing from about 85 to about 92% by weight of the vinyl halide constituents. Suitable copolymers of this specific type are formed from vinyl chloride and vinyl acetate.

The plasticizing ingredients, according to this invention, conform generally to the formula:

wherein R' is an acyl group derived from a mono-carboxylic acid selected from the group consisting of aliphatic, cycloaliphatic, araliphatic, aromatic, and heterocyclic acids containing less than 23 carbon atoms per molecule, and R" is a monovalent radical derived from a honohydric compound selected from the group consisting of aliphatic, cycloaliphatic, araliphatic, and heterocyclic alcohols, phenols, and alkoxy-substituted derivatives of said alcohols and phenols, and said ester has an iodine number of up to about 15. The acyloxy group of the 12-acyloxy stearic acid ester may be derived from the mono-carboxylic acids of which the following are exemplary:

Acetic, butyric, caproic, caprylic, capric, undecylenic, lauric, oleic, stearic, erucic;
Naphthenic, abietic, hexahydrobenzoic;
Benzoic, salicyclic, naphthoic, toluic;
Nicotinic, furoic, furylacrylic.

Mono-carboxylic acids having from 7 to 18 carbon atoms form a suitable group of acids from which R' acyloxy groups may be derived.

The monohydric alcohol-type compounds from which the monovalent radical R" is derived include the following:

Methyl, ethyl, propyl, iso-propyl, n-butyl, t-butyl, sec-butyl, n-octyl, 2-ethyl-hexyl, nonyl, decyl, oleyl, stearyl alcohols;

Cyclohexyl, methyl-cyclohexyl, cyclopentyl, abietyl alcohols;

Benzyl, phenyl-ethyl alcohols;

Tetrahydrofurfuryl, furfuryl alcohols; beta-hydroxypyridine;

2-methoxy-ethyl, 3-ethoxy-propyl, 2-butoxy-ethyl, 2-benzyloxy-ethyl, and mono-methyl ether of diethylene glycol, mono-butyl ether of dipropylene glycol;

Phenol, o-cresol, sym.-xylenol, 2-naphthol, 1-methyl-2-naphthol.

The stabilizing ingredients according to the present invention are the alkaline earth metal salts of ricinoleic acid, such as calcium ricinoleate, barium ricinoleate, strontium ricinoleate. Barium ricinoleate is the preferred stabilizer, although the other alkaline earth stabilizers may be used.

Barium ricinoleate may be prepared from methyl ricinoleate as follows:

EXAMPLE 1

12.7 g. of sodium hydroxide were dissolved in 125 g. of water; the mixture was brought to a boil; and, then, 100 g. of methyl ricinoleate were slowly added. The solution was diluted to 1,000 cc. with cold water and remained clear. With this diluted solution at 30° C., 45.0 g. of barium chloride (BaCl₂·2H₂O) dissolved in 405 g. of water, were slowly added. A fine, white precipitate formed; this was separated by filtration, given two water washes and one methyl alcohol wash, pressed reasonably free of liquid, and then air-dried. The dried product was slightly waxy, and was ground into a fine powder for use as a vinyl resin stabilizer.

Barium ricinoleate may also be prepared from castor oil as follows:

EXAMPLE 2

12.8 g. of sodium hydroxide were dissolved in 125 g. of water, and the solution was brought to a boil. 100 g. of castor oil were then added, and the resulting solution was brilliantly clear. This solution was diluted to 1,000 cc., the solution remaining clear. With this solution at 30° C., 48.0 g. of barium acetate mono-hydrate, which had been dissolved in 500 cc. of water, were added. A fine, white precipitate formed; this precipitate was washed four times by filtering it free of liquid, and then returning it to a fresh lot of water for redispersion. This extra washing procedure was used to assure complete removal of glycerine. A final wash was made with methyl alcohol and, after the precipitate had been separated from the alcohol by filtration, it was gently pressed and then air-dried. The final soap was ground to a truly fine powder, which was highly suitable for use as a vinyl resin stabilizer.

The esters of acylated 12-hydroxy stearic acid may be conveniently prepared as set forth hereinafter. The esters are most conveniently prepared commercially by preparing the ester of ricinoleic acid with the desired alcohol or phenolic compound. As shown below, in the examples, the reaction may be effected directly by an ester-interchange between castor oil and the desired alcohol. The acylation of the 12-hydroxy group of the ricinoleic ester is then carried out, and this step is followed by catalytic hydrogenation.

An alternative, but not a preferred, method for preparing the esters involves the acylation of the 12-hydroxy stearic acid esters as the last step in the process. While this order of preparation may be followed, it requires the use of special insulation, steam jacketing, and similar precautions to keep the materials molten in the reaction vessels and in the pipe lines, since these esters are waxy materials prior to acylation.

The preparation of a representative number of examples of the 12-acyloxy stearic acid esters is described in detail in the following examples, wherein the parts are expressed in terms of weight, unless otherwise specified. In these examples, the preferred stages of preparation involve first, esterification of ricinoleic acid (or castor oil), then acylation, and finally hydrogenation. The esterification is carried out, in the normal manner, using an acid catalyst, such as sulfuric acid, or an alkaline catalyst, such as sodium hydroxide; the final reaction mixture is neutralized, freed from excess alcohol or phenolic compounds, and the resulting ester is polished and dried. This intermediate ester is acylated by usual techniques, using a monocarboxylic acid, or a halide or anhydride thereof. The acylated esters are then hydrogenated under rather mild conditions, using a nickel catalyst, relatively low pressure (e. g., about 250 to 300 pounds per square inch), and at moderate temperatures from about 100° to 125° C.

EXAMPLE 3

*Preparation of methyl 12-acetoxy stearate*

400 parts of castor oil (free fatty acid content: 0.10%) were charged to a still, together with 124 parts by weight of methyl alcohol containing 2.0 parts of sodium hydroxide. Agitation was used to promote the reaction. The reaction was allowed to proceed for a period of 25 minutes at a temperature of 25°–30° C. At the end of this time, the agitation was stopped and the reaction mixture was neutralized with phosphoric acid, which was added in slight excess so as to eliminate the possibility of emulsion formation. Heat was then applied to the still so as to effect the distillation of the unreacted methyl alcohol. Near the end of the distillation, sparging steam was introduced into the still to aid in the removal of the last traces of alcohol. After the still contents had been cooled, they were placed in a separator; the glycerine layer was withdrawn from the separator by gravity. The remaining mixture was washed countercurrently in the apparatus described in Colbeth U. S. Patent No. 2,249,746. After drying, the methyl esters of castor oil fatty acids had the following physical constants: refractive index at 25° C. was 1.4619; specific gravity at 15° C. was 0.929; viscosity (Gardner-Holdt) was A. The free fatty acid content of these esters was 0.10%.

The methyl ester thus obtained was then acetylated by refluxing 587 parts of the methyl ester with 179.5 parts of acetic anhydride for approximately one hour. At the end of this time, the acetic acid and unreacted acetic anhydride were distilled off, and the resulting ester was deodorized by sparging with steam under vacuum to free it from the final traces of acetic anhydride and acids. The resulting ester had a refractive index of 1.4548, a saponification value of 299.0, and an iodine value of 76.0. This ester was catalytically hydrogenated to an iodine value of 4.1, the final product being methyl 12-acetoxy stearate.

EXAMPLE 4

*Preparation of the 2-methoxyethyl ester of 12-acetoxy stearic acid*

300 parts of castor oil (having a free fatty acid content of 0.3%) were reacted with 220 parts of 2-methoxyethanol in the presence of 3 parts of a 50% aqueous solution of sodium hydroxide for 2 hours at 25°–30° C. At the end of this time, the catalyst was neutralized with diluted phosphoric acid; the excess methoxyethanol was distilled from the reaction mixture under vacuum; the distillation residue was water-washed in an apparatus similar to that described in Colbeth U. S. Patent No. 2,249,746; and the separated ester was dried under vacuum. The 2-methoxyethyl ricinoleate prepared had the following constants; refractive index: 1.4648: spec. gravity (15° C.): 0.954: viscosity (Gardner-Holdt): A; saponification value: 158.8.

587 parts of the 2-methoxyethyl ricinoleate were mixed with 207 parts of acetic anhydride, and the mixture was refluxed gently for 1 hour. At the end of this time, the acetic acid and excess acetic anhydride were distilled off, and the remaining ester was deodorized by steam sparging under vacuum. The product had a refractive index of 1.4570, a saponification value of 286.2, and an iodine value of 68.0. The product was then hydrogenated catalytically to an iodine value of 2.2, the hydrogenated ester being the 2-methoxyethyl ester of 12-acetoxy stearic acid.

EXAMPLE 5

*Preparation of benzyl 12-propionoxy stearate*

0.3 part of sodium hydroxide was dissolved in 60 parts of warm benzyl alcohol. 100 parts of castor oil were added, and the mixture was held at 150° C. for 2 hours. After cooling, the reaction product was washed, dried, and freed from excess alcohol by heating under vacuum. The refractive index of the benzyl ricinoleate was 1.4900.

320 parts of benzyl ricinoleate were mixed with 132 parts of propionic anhydride, and the mixture was refluxed gently for 1 hour. At the end of this time, the propionic acid and excess propionic anhydride were distilled off, and the remaining ester was deodorized by steam sparging under vacuum. The resulting light-colored ester was then hydrogenated catalytically to an iodine value of 10, the final product being benzyl 12-propionoxy stearate.

EXAMPLE 6

*Preparation of cyclohexyl 12-stearoxy stearate*

75 parts of cyclohexyl alcohol, containing 0.25 part of sodium hydroxide, were mixed and heated with 100 parts of castor oil at 150° C. for three hours. After cooling, the reaction product was washed, dried, and freed from excess alcohol by heating under vacuum. 350 parts of the resulting cyclohexyl ricinoleate were mixed and heated with 265 parts of stearic acid at 200°–210° C. for 4 hours. During this heating period, the reaction mixture was gently agitated with $CO_2$ gas. After being washed with methyl alcohol, the product was hydrogenated catalytically to an iodine value of 7.5.

EXAMPLE 7

*Preparation of tetrahydrofurfuryl 12-abietoxy stearate*

300 parts of ricinoleic acid and 150 parts of tetrahydrofurfuryl alcohol, together with 3 parts of sulfuric acid and 100 cc. of toluene, were refluxed for 2.5 hours. A water trap in the condenser system allowed the separation of the water formed in the esterification reaction and the return of the toluene to the reaction zone. The cooled product was neutralized, washed, dried, and residual toluene, as well as excess alcohol, were separated by distillation under vacuum. 300 parts of the resulting ester were then heated with 225 parts of abietic acid at 250° C. for 4 hours. The reaction mixture was agitated with $CO_2$ gas during this period. The cooled ester was washed with methyl alcohol, and then catalytically hydrogenated to an iodine value of 15.

EXAMPLE 8

*Preparation of phenyl 12-toluoxy stearate*

110 parts of thionyl chloride were slowly added to a mixture of 90 parts of phenol and 285 parts of ricinoleic acid. When the thionyl chloride addition was completed, the reaction mixture was heated to drive off all of the HCl and $SO_2$. The resulting phenyl ricinoleate was purified by vacuum distillation. 300 parts of the purified ester were then heated with 110 parts of p-toluic acid for 4.5 hours at 185° C. The product was then cooled, washed with methyl alcohol, and catalytically hydrogenated to an iodine value of 3.8.

EXAMPLE 9

*Preparation of the 2-ethylhexyl ester of 12-furoxy stearic acid*

4 cc. of concentrated sulfuric acid were dissolved in 2000 gms. of 2-ethylhexanol, 1600 gms. of castor oil were then added, and the mixture was refluxed for one hour. The resulting product was washed and dried. The saponification value of the 2-ethylhexyl ricinoleate was 137.8, as contrasted to a theoretical value of 136.5.

400 parts of this ricinoleic acid ester were then heated with 110 parts of 3-furoic acid at 150° C. for 4 hours. The resulting ester was washed with methyl alcohol, and then catalytically hydrogenated to an iodine value of 10.5.

EXAMPLE 10

*Preparation of cetyl 12-acetoxy stearate*

A mixture of 300 parts of ricinoleic acid, 250 parts of cetyl alcohol, 3 parts of sulfuric acid, and 150 cc. of toluene was refluxed for 3 hours. A water trap was arranged in the condenser system so that water formed during the esterification could be separated, and the toluene returned to the reaction zone. The product of this reaction was neutralized, washed, dried, and residual toluene was separated by vacuum distillation. This ester was then acetylated by refluxing with an equal volume of acetic anhydride. The resulting product was washed, dried, and then catalytically hydrogenated to an iodine value of 13.0.

EXAMPLE 11

*Preparation of 2-benzyloxypropyl ester of 12-acetoxy stearic acid*

200 parts of 2-benzyloxypropyl alcohol and 200 parts of ricinoleic acid were combined with 1.5 parts of concentrated sulfuric acid. This mixture was refluxed at 150° C. The refluxing was continued until no more water formed, the water being separated in a water trap in the condenser system. The product was then neutralized, washed, and dried. This ester was then acylated by refluxing with an equal volume of acetic anhydride. The resulting product was washed, dried, and then catalytically hydrogenated to an iodine value of 6.0.

EXAMPLE 12

*Preparation of ester of mono-butyl ether of diethylene glycol and 12-propionoxy stearic acid*

1000 cc. of ricinoleic acid and 1000 cc. of the mono-butyl ether of diethylene glycol were refluxed for 3 hours, in the presence of 2% of concentrated HCl, based on the weight of the ricinoleic acid. Also present in the reaction zone were 200 cc. of xylol, which aided in the separation of water in the water trap in the condenser system. The product was neutralized with chalk, bleached with 2% of a neutral-reacting, acid-activated bleaching earth and 0.5% of a powdered, activated carbon, filtered, and washed thoroughly 3 times with hot water to remove the excess ether alcohol. It was then dried under vacuum at 140° C., 1400 gms. of ester being obtained. Its properties were as follows: refractive index: 1.4598; specific gravity: 0.949; saponification value: 130.5; acetyl value: 125.2.

Equal volumes of the above ester and propionic anhydride were refluxed for 3 hours. The excess anhydride and acid were then washed out of the product, and the product was dried under vacuum. Catalytic hydrogenation reduced the iodine value of the product to 3.3.

The hydrogenated esters according to this invention may be used with the vinyl resins in amounts ranging from about 1 to about 40% by weight, based on the weight of the total composition. When amounts as low as 1% of the ester are used, the resulting compositions are not flexible, and are shaped by the usual molding process. When amounts on the order of about 40% of the ester are used, films prepared from the resulting composition are very flexible, have improved low temperature flexibility and good drape. The films having good drape are those which conform exactly to any surface on which they are placed. When the amount of ester used ranges higher than 40% by weight, there is some tendency for the ester to exude from the film. In general, the optimum amount of hydrogenated ester to be mixed with the vinyl resin is about 20–35% by weight, based on the total composition.

The amount of the stabilizer is preferably between about 0.5% and about 5%, based on the weight of the resin. In pigmented films, quantities of the stabilizer may exceed 5% by weight on the same basis, but in unpigmented films about 3% represents the maximum amount of stabilizer which can be used in the clear film without causing cloudiness.

The stabilizers described herein have been found to be specifically and advantageously useful with compositions comprising the species of vinyl resins described above and a hydrogenated ester plasticizer. Based on the data available, these stabilizers have not been found to provide outstanding advantages when used with other vinyl resins containing the plasticizers described above.

The stabilizers of this invention, and particularly barium ricinoleate, effectively stabilize vinyl resin films containing the described plasticizers, as regards their color and flexibility. As shown below, unstabilized films incorporating the substantially hydrogenated esters described above were unsatisfactory after intense light treatment with the Fade-O-Meter, due to spewing of the plasticizer from the film, whereas the stabilized films showed no evidence of spewing.

In the following examples, the film used in each instance was prepared from a vinyl chloride-vinyl acetate copolymer containing from about 85 to about 92% by weight of vinyl chloride. Each film contained 70 parts by weight of the vinyl resin, 30 parts by weight of the plasticizer, and, when stabilized, 2 parts by weight of barium ricinoleate. The films were 0.02" thick. In the following charts, those columns headed "O" contain the data on unstabilized compositions; those columns headed "S" include the data on the compositions containing the stabilizer in accordance with the present invention.

EXAMPLE 13

Sunlight aging

Various films including the plasticizers listed below were subjected to aging in sunlight for 100 hours, 200 hours, and 300 hours. The results show that those films containing the compositions of the invention were considerably more flexible and also more free from color than combinations of ingredients incorporating esters having iodine numbers greater than 15 together with the barium ricinoleate stabilizer, or either type of ester without the stabilizer.

*Sunlight aging results*

| Plasticizer | 100 hrs. | | 200 hrs. | | 300 hrs. | |
|---|---|---|---|---|---|---|
| | O | S | O | S | O | S |
| Methyl 12-acetoxy ricinoleate. | | Grayish; somewhat flexible. | | pale, reddish brown; stiff. | | light, reddish brown; some specks; stiff. |
| Methyl 12-acetoxy stearate (I₂ No.: 40). | colorless; some dark specks; flexible. | Grayish; flexible. | yellowish, with brown specks; somewhat flexible. | grayish; some red brown specks; somewhat flexible. | reddish brown; speckly; rather stiff. | mottled; light reddish brown; rather stiff. |
| Methyl 12-acetoxy stearate (I₂ No.: 4.1). | do | Colorless; flexible. | yellowish, with brown specks; more flexible than above; slightly tacky. | some gray specks; flexible. | light brown with reddish brown specks; somewhat flexible. | grayish, with dark specks; flexible. |
| 2-Methoxyethyl ester of 12-acetoxy ricinoleic acid. | | Grayish; somewhat flexible. | | light red brown; stiff. | | light reddish brown; stiff. |
| 2-Methoxyethyl ester of 12-acetoxy stearic acid (I₂ No.: 30). | | Slightly grayish; flexible. | | dark specks; somewhat flexible; slightly tacky. | | mottled; light reddish brown with dark specks; rather stiff. |
| 2-Methoxyethyl ester of 12-acetoxy stearic acid (I₂ No.: 2.2). | | Colorless; flexible. | | some gray specks; flexible. | | grayish, with dark specks; rather flexible; slightly tacky. |
| benzyl 12-propionoxy stearate (I₂ No.: 10.0). | dark spots | free from specks; colorless; flexible. | yellowish with dark specks. | free from specks; colorless; flexible. | | |
| cyclohexyl 12-acetoxy stearate (I₂ No.: 7.5). | do | do | do | do | | |
| tetrahydrofurfuryl 12-abietoxy stearate (I₂ No.: 15.0). | do | do | do | do | | |
| phenyl 12-toluoxy stearate (I₂ No.: 3.8). | do | do | do | do | | |
| 2-ethylhexyl ester of 12-furoxy stearic acid (I₂ No.: 10.5). | do | do | do | do | | |
| 2-benzyloxypropyl ester of 12-acetoxy stearic acid (I₂ No.: 6.0). | do | do | do | do | | |
| ester of monobutyl ether of diethylene glycol and 12-propionoxy stearic acid (I₂ No.: 3.3). | do | do | do | do | | |

EXAMPLE 14

Heat aging

Each of the following films was placed in an oven for 120 hours at 100° C. It is apparent that the combination of the present invention was superior to films containing plasticizers in which the iodine number is greater than 15.

| Plasticizer | 120 Hrs. at 100°C. | |
|---|---|---|
| | 0 | 8 |
| 2-Methoxyethyl ester of 12-acetoxy ricinoleic acid | yellow; rather stiff | pale yellow; somewhat flexible. |
| 2-Methoxyethyl ester of 12-acetoxy stearic acid ($I_2$ No.: 30) | pale yellow; somewhat flexible. | slightly yellow; somewhat flexible. |
| 2-Methoxyethyl ester of 12-acetoxy stearic acid ($I_2$ No.: 2.2) | colorless; flexible | colorless; flexible. |
| 2-Benzyloxy-propyl ester of 12-acetoxy stearic acid ($I_2$ No. 6.0) | ----do---- | Do. |

EXAMPLE 15

Light aging

Films including the following plasticizers, with and without the barium ricinoleate stabilizer, were exposed to ultra violet light as produced by a carbon arc for 100 hours in a Fade-O-Meter, a product of the Atlas Electrical Devices Co. It is apparent from the results of the test that the combination in accordance with the present invention was superior to the other films, in that it was, at the end of the exposure period, colorless, flexible, and exhibited no spewing. Comparison of the test results of Example 14 with those of Example 15 shows that, of the films tested, the only ones which exhibited resistance both to heat and to the intense light are the films embodying the present invention.

about 15, and as a stabilizer therefor a small amount, but at least 0.5%, based on the weight of the copolymer, of an alkaline earth metal ricinoleate.

2. The composition of claim 1, in which said polymerization product is a copolymer of vinyl chloride and vinyl acetate containing from about 88 to about 91% by weight of vinyl chloride based on the total weight of the copolymer.

3. The composition of claim 1, in which the R' group of said plasticizing modifier is an aliphatic acyl group containing from 7 through 18 carbon atoms.

4. The composition of claim 1, in which the R'' group of said plasticizing modifier is derived from an aliphatic alcohol.

5. The composition of claim 1, in which the R'' group of said plasticizing modifier is derived from an araliphatic alcohol.

6. The composition of claim 1, in which said plasticizing modifier is present in an amount of from about 20 to about 35% by weight, based on the total composition.

7. The composition of claim 1, in which said plasticizing modifier is methyl 12-acetoxy stearate.

8. The composition of claim 1, in which said

| Plasticizer | 100 Hrs Fade-O-Meter | |
|---|---|---|
| | 0 | 8 |
| 2-Methoxyethyl ester of 12-acetoxy ricinoleic acid | colorless; somewhat flexible; slight spewing. | grayish; somewhat flexible; no spewing. |
| 2-Methoxyethyl ester of 12-acetoxy stearic acid ($I_2$ No.: 30) | some yellowish discoloration; somewhat flexible; some spewing | colorless; flexible; no spewing |
| 2-Methoxyethyl ester of 12-acetoxy stearic acid ($I_2$ No.: 2.2) | some yellowish discoloration; flexible; spewing | Do. |
| 2-Benzyloxypropyl ester of 12-acetoxy stearic acid ($I_2$ No.: 6.0) | ----do---- | Do. |

What is claimed is:

1. A composition of matter comprising a copolymer of vinyl chloride and vinyl acetate containing from about 85% to about 92% by weight of vinyl chloride based on the total weight of the copolymer, from about 1% to about 40% by weight, based on the weight of the total composition, of a plasticizing modifier therefor comprising an ester of 12-hydroxy stearic acid having the following formula:

wherein R' is an acyl group derived from a mono-carboxylic acid selected from the group consisting of aliphatic, cycloaliphatic, araliphatic, aromatic, and heterocyclic acids containing less than 23 carbon atoms per molecule, and R'' is a monovalent radical derived from a monohydric compound selected from the group consisting of aliphatic, cycloaliphatic, araliphatic, and heterocyclic alcohols, phenols, and alkoxy-substituted derivatives of said alcohols and phenols, and said ester has an iodine number of up to plasticizing modifier is the 2-methoxyethyl ester of 12-acetoxy stearic acid.

9. The composition of claim 1, in which said plasticizing modifier is benzyl 12-propionoxy stearate.

10. The composition of claim 1 in which the alkaline earth metal ricinoleate is barium ricinoleate.

11. A composition of matter comprising a copolymer of vinyl chloride and vinyl acetate containing from about 85% to about 92% by weight of vinyl chloride based on the total weight of the copolymer, from about 1% to about 40% by weight, based on the weight of the total composition, of a plasticizing modifier therefor comprising an ester of 12-hydroxy stearic acid having the following formula:

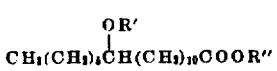

wherein R' is an acyl group derived from a mono-carboxylic acid selected from the group consisting of aliphatic, cycloaliphatic, araliphatic, aromatic, and heterocyclic acids containing less than 23 carbon atoms per molecule, and R" is a monovalent radical derived from a monohydric compound selected from the group consisting of aliphatic, cycloaliphatic, araliphatic, and heterocyclic alcohols, phenols, and alkoxy-substituted derivatives of said alcohols and phenols, and said ester has an iodine number of up to about 15, and as a stabilizer therefor from about 0.5% to about 5% by weight, based on the weight of the copolymer, of an alkaline earth metal ricinoleate.

12. A composition of matter comprising a copolymer of vinyl chloride and vinyl acetate containing from about 85% to about 92% by weight of vinyl chloride based on the total weight of the copolymer, from about 1% to about 40% by weight, based on the weight of the total composition, of a plasticizing modifier therefor comprising an ester of 12-hydroxy stearic acid having the following formula:

wherein R' is an acyl group derived from a mono-carboxylic acid selected from the group consisting of aliphatic, cycloaliphatic, araliphatic, aromatic, and heterocyclic acids containing less than 23 carbon atoms per molecule, and R" is a monovalent radical derived from a monohydric compound selected from the group consisting of aliphatic, cycloaliphatic, araliphatic, and heterocyclic alcohols, phenols, and akoxy-substituted derivatives of said alcohols and phenols, and said ester has an iodine number of up to about 15, and as a stabilizer therefor from about 0.5% to about 3% by weight, based on the weight of the copolymer, of an alkaline earth metal ricinoleate.

MALCOLM KENT SMITH.

REFERENCES CITED

The following references are of record in the file of this patent:

UNITED STATES PATENTS

| Number | Name | Date |
| --- | --- | --- |
| 2,075,543 | Reed et al. | Mar. 30, 1937 |
| 2,122,716 | Graves | July 5, 1938 |
| 2,156,956 | Agens | May 2, 1939 |
| 2,310,395 | Caruthers | Feb. 9, 1943 |
| 2,332,849 | Gruber et al. | Oct. 26, 1943 |
| 2,385,359 | Hunter et al. | Sept. 25, 1945 |